July 5, 1938. C. L. EKSERGIAN 2,123,100
SINGLE STAMPING ARTILLERY WHEEL
Filed Feb. 16, 1933
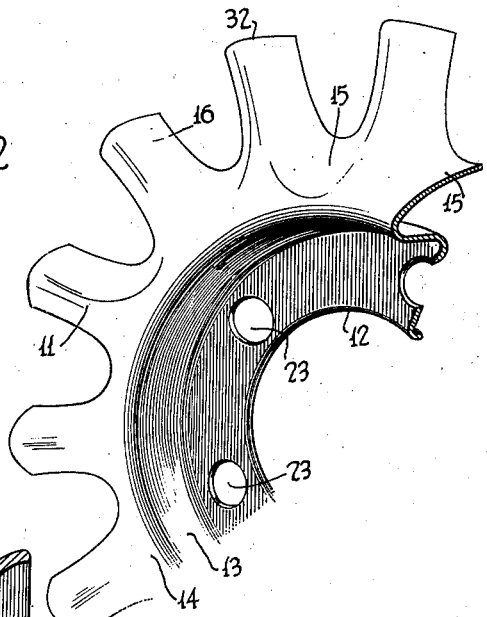
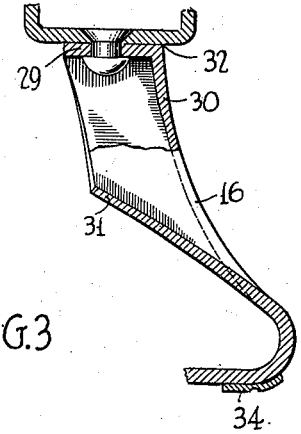
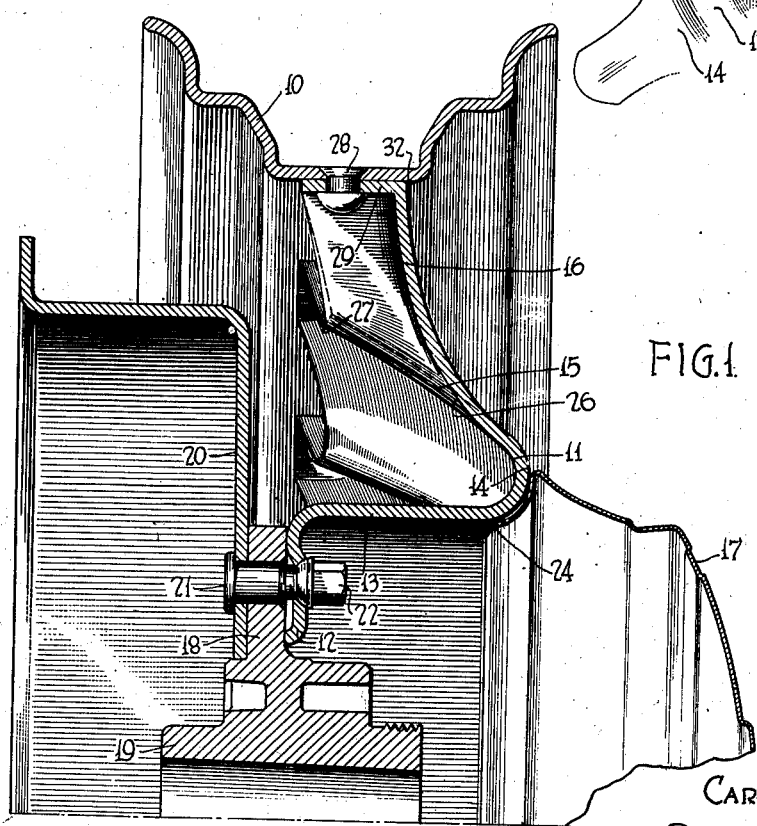
INVENTOR.
CAROLUS L EKSERGIAN
BY
ATTORNEY.

Patented July 5, 1938

2,123,100

UNITED STATES PATENT OFFICE 2,123,100

SINGLE STAMPING ARTILLERY WHEEL

Carolus L. Eksergian, Detroit, Mich., assignor to Budd Wheel Company, Philadelphia, Pa., a corporation of Pennsylvania Application February 16, 1933, Serial No. 657,061

12 Claims. (Cl. 301—9)

This invention relates to pressed metal artillery motor vehicle wheels in which the wheel bodies are of the type illustrated in my copending application Serial No. 603,085, filed April 4, 1932, and the invention refers more particularly to wheels having a single stamping adapted to carry the wheel load between the hub and rim.

The primary object of the invention is the construction of a pressed metal wheel body of this type, of very great strength and light weight.

Another object of the invention is to so construct a spoked wheel that the nave thereof has the characteristic high section modulus of the single-dished-disc-type of wheel body and will additionally, act in operation as a disc, thus giving to the wheel at large great strength in those zones where the greatest stresses occur, and at the same time including therein the characteristic resistance to loads so advantageously employed in the well-known single-dished-disc type of wheel.

Another object of the invention is to so fabricate a wheel that the sole load-carrying support thereof may be by means of a unitary sheet metal body extending freely and without support between the hub and the rim.

Another object of the invention is the provision of a single-stamping wheel body having outwardly of its mounting portion or bolting-on flange three annular zones, the inner zone comprising a dished disc of the type employed in the disc wheels; the outer zone constituting spokes or spoke-like formations of hollow section and preferably of considerable depth to give them the necessary section modulus, and the intermediate zone constituting a merger between the outer and inner zones wherein the spokes have roots pressed from a prolongation of the inner disc zone, such intermediate zone being reinforced by the short, strong spokes, being located by its diameter and the diameter of the inner or disc zone at a point such that it is subjected to minor wheel stresses, and through the gradual merger of the spoke roots with the prolongation of the inner zone substantially uniformly distributing loads to the inner disc zone.

Another object of the invention is the production of a wheel of this type having an integral spoke end closure.

I attain these and other objects by fabricating the wheel body from a sheet metal blank, which may either be of uniform thickness or tapering in thickness to its outer periphery, and in the derivation of the nave so forming the material that the nave itself actually constitutes a dished disc of substantial diameter including the inner and intermediate zones above mentioned, said nave preferably likewise including an axially facing channel of substantial radial and axial depth.

Fig. 1 shows the upper half of a wheel of the present type presented in section along a diametral plane;

Fig. 2 is a partial perspective of the same wheel body; and

Fig. 3 is a section of the upper half of a modified form of the wheel along the diametral plane corresponding to Fig. 1.

The above-enumerated desirable features and others incidental thereto are advantageously attained by constructing a wheel substantially as disclosed. This wheel comprises a rim member 10, shown, for the purpose of illustration, as of the conventional drop-center type, although, obviously, other forms of rim member may be readily employed. The wheel body at large, generally indicated at 11, comprises a unitarily stamped spider including a radially-extending mounting flange portion 12 which, in turn, includes the bolting-on circle, an axially-extending hub shell portion 13 merging at its inner end with said flange portion and at its outer end through a substantially annular portion 14 of semicircular section with a deep conical spoke-bearing portion 15, and spokes 16 which have their roots pressed from the peripheral areas of the spoke-bearing portion 15. This wheel body is secured to the flange 18 of the hub 19 through the medium of stud bolts 21 which serve to anchor the brake drum 20 and are directed through openings 23 in the flange for engagement with retaining nuts 22.

The mounting flange 12, the hub shell portion 13, the annular portion 14 and the conical spoke-bearing portion 15 comprise the nave at large consisting of the two inner zones and this nave is constructed as a single deeply dished disc extending freely in sheet form, when the wheel is mounted in position upon the hub 19, from the hub flange 18 without other reinforcement or support from any adjacent part of the hub, and deriving a large measure of increased strength from its disc-wheel-like configuration. In order that the advantages of the disc structure may be enjoyed to the fullest extent, the diameter of the nave is relatively great, approximating the diameter of the wheel body at large, and preferably such that the radial extent of the nave beyond the bolting-on flange is at least as great as the lengths of the main bodies of the spokes extending therebeyond, its outer periphery being thus located at least midway from the outer periphery of the bolting-on flange to the outer ends of the spokes. The nave is, likewise, made axially very deep, since deep coned forms are common in single dished disc wheels and are well known to possess high section moduli in the diametral plane.

The formation of the nave section of the wheel is, in accordance with my invention, that of the single-dished-disc-type of wheel body and may be varied in accordance with the accustomed practice in the formation of this type of disc. Preferably, however, the type of formation illustrated is employed, the spoke-bearing portion overlying the axially-extending hub shell portion 13 for a substantial depth and cooperating therewith to produce a deep axially-facing channel, such constructions having been demonstrated as lending great strength to the single disc type of wheel. While the depth of this channel may vary considerably in the production of wheels, due to the necessity of accommodating the wheel as a whole to the hub flange 18 and brake drum 20 of the wheel hub, a substantial channel depth is preferably utilized, that illustrated in the present instance having an axial depth substantially as great as the lengths of the main bodies of the spokes. Generally speaking, however, if the nave section outwardly of the bolting-on flange is kept free from radially planar sections and given radial and axial extents the sum of which is at least twice as great as the lengths of the main bodies of the spokes with the outer periphery of the nave located at least midway from the outer periphery of the bolting-on flange to the outer periphery of the wheel body at large while still retaining the single-dished-disc-wheel form, it will be deeply dished and a strong and durable form is provided giving the wheel adequate strength, as will be obvious to all familiar with the behavior of disc wheel constructions.

The nave should also have a diameter comprising, by far, the major portion of the diameter of the wheel body at large, that illustrated in the present instance comprising approximately seventy-five per cent of the body diameter. The spoke-bearing portion 15 is, of itself, disc-wheel-like and has its radially outer areas relatively deeply dished axially in one and the same direction from the outer peripheral edge thereof, thus providing a base for the deep channel spokes 16, the roots 26 of which preferably gradually emerge from the spoke-bearing portion in order that the annular continuity thereof may be retained through as great a radial extent as possible.

Thus, the wheel body at large outwardly of the bolting-on flange 12 consists of three zones, the inner zone including the hub shell portion 13 and arch portion 14 and comprising a deeply dished disc zone of considerably radial and axial extent and having in operation the characteristic section modulus and resistance to loads of the well-known dished-disc wheel. The outer zone comprises the spokes 16, and the intermediate zone 15 a zone of merger between the outer and inner zones constituting the roots of the spokes pressed out from the prolongation of the disc zone and extending approximately between the points 26 and 27 of Figure 1. Through the use of short spokes of high section modulus, and gradual emergence and pressing out of the spoke roots, the reinforcement of this zone and the dissemination of stresses through this zone to the disc portion is such that the disc effect is, to a considerable extent, continued to the periphery of the outer or spoke-bearing portion of the nave; that is to say, that portion of the nave including the outer terminus of the disc section and the zone of merger just referred to.

The radial elongation of the nave foreshortens the lengths of the spokes, this foreshortening being complemental to the elongation of the diameter of the nave portion. The spokes themselves are made of substantial cross section, thereby becoming, because of their short length, stubby, so that they may serve to reinforce the interrupted portions of the nave occurring as a result of the spoke formations and, to a great extent, restore through their reinforcement the effective continuity in the nave section. Thus, the web portions between adjacent spoke roots, which constitute the prolongation of the truly annular portions of the nave, become substantially as strong as the remaining portions of the nave body. As hereinbefore stated, the spoke roots emerge gradually from the nave, merging therewith through curves of substantial radius, and the root portions of the spokes are of substantial U-section and gradually increasing depth outwardly from the innermost spoke root portions to the outer periphery 27 of the nave. The back walls of the spokes preferably slope rearwardly, since this has been found to assist in proper working of the metal when a deep draw is made. It also adapts itself for desirable arrangement of cover plates closing in the back of the spokes or reinforcing the nave portions or for enclosing the entire back portion of the wheel.

The securement of the spoke body and rim members is attained by any of well-known methods, such as by rivets 28 or, perchance, spot or spud welding and other means may be used.

A very desirable and highly useful item of the construction resides in the closed end spokes 16 attained by means of an integral substantially axially extending spoke end portions 29. As will readily be observed in the drawing, these portions provide very sharp substantially right angular corners 32 with the side walls of the spokes. This is very valuable in that it adds greatly to the appearance of the wheel and presents a very clean and well-fitting rim connection.

The wheel body may, after the final operations, have a general form such as the section which Fig. 1 presents which may, under slightly variable circumstances, appear as shown in the section of Fig. 3. In Fig. 3 the outer end closures 29 of the spokes 16 and the outer portions 30 of the spokes 16 may be of slightly increased thickness resulting from the forming operations in the making of the wheel. The web portions between the spokes may likewise be of variable thickness and may taper off as at 31 to a reduced thickness consequent to the deep drawing operations occurring in the drawing of the spoke and nave portions. The relative variations in these thicknesses are controlled by the development of the wheel body in the fabrication processes, and are of vital relation to the high section modulus attained in the wheel body as a whole.

The hub shell portion of the nave is shown to be cylindrical and axially extending of considerable depth, but variations in form and depth are truly within the spirit of the invention. This hub shell member may be provided with small slots 24, as in Fig. 1, near the outer axial extremity thereof or as at 34 of Fig. 3, arranged to provide means for securing the hub cover 17. This may be accomplished in other ways by ribs, snap fasteners or other means secured in this general location.

The construction as previously described gives a wheel having a very high section modulus in a diametral plane. It also provides a wheel of great strength in the hub shell and nave portions and one in which weaving strains may be disseminated through the conical structural portions. The highly desirable characteristics of a cone utilized in disc wheels are attained in this wheel body, rendering it entirely satisfactory for use on most motor vehicles, but when heavy vehicles are to be equipped with these wheels, vehicles heavier than the average passenger car, the wheels may, if desired, be reinforced by reinforcing plates in lieu of employing heavier gauge metal, as illustrated in my prior application above noted. If it is desirable to prevent the accumulation of dirt inside the wheel body, this may be accomplished by using backing plates of extremely thin material serving to close the wheel body. If it is desirable to merely increase the load-carrying qualities of the wheel without closing in the backs of the spokes, the uncorrugated or uninterrupted effect of a conical nave portion may be provided by securing the spoke side walls together at the periphery of the nave by means of an annulus of some sectional form. A number of these features are the subject of my copending application Serial No. 603,085, filed April 4, 1932, for Single stamping artillery wheel and are not specifically claimed herein.

The embodiment of the invention illustrated and described has been selected for clearly setting forth the principles involved. It will be apparent, however, that the inventive concept may be susceptible of being modified to meet the different conditions encountered in its use, and it is, therefore, made to cover by the appended claims, all modifications within the true spirit and scope of this invention.

What I claim is:

1. A vehicle wheel of the demountable bolted-on type consisting of a rim, a hub, and a wheel body forming the sole connection between the hub and rim, said wheel body consisting solely of a single unsupported stamping having a substantially radially-extending bolting-on flange, a conical disc-like spoke-bearing portion radially outwardly of said flange, an annular generally axially-extending portion connecting said flange and spoke-bearing portion and forming with the spoke-bearing portion an axially-facing channel, and spokes of deep channel section extending radially out from the spoke-bearing portion and having roots pressed from said conical portion, said spoke roots extending over the major portion of the radial extent of said conical portion.

2. A vehicle wheel of the demountable bolted-on type consisting of a rim, a hub, and a wheel body forming the sole connection between the hub and rim, said wheel body consisting solely of a single unsupported stamping having a substantially radially-extending bolting-on flange, a generally conical disc-like spoke-bearing portion radially outwardly of said flange, an annular generally axially-extending portion connecting said flange and spoke-bearing portion, and forming with the latter an axially-facing channel, and spoke formations of channel section extending radially outwardly from said spoke-bearing portion and having root portions pressed from and extending over a substantial portion of the axial extent of said spoke-bearing portion.

3. A vehicle wheel of the demountable bolted-on type consisting of a rim, a hub, and a wheel body forming the sole connection between the hub and rim, said wheel body consisting solely of a single unsupported stamping having a substantially radially-extending bolting-on flange, a conical disc-like spoke-bearing portion radially outwardly of said flange, an annular generally axially-extending portion connecting said flange and spoke-bearing portion and forming with the spoke-bearing portion an axially-facing channel, and spokes of deep channel section extending radially out from the spoke-bearing portion and having roots pressed from said conical portion, said spoke roots extending over the major portion of the radial extent of said conical portion, said spoke roots emerging gradually from said conical portion and being connected to said conical portion through a radial extent and through an axial extent approximating the length of the main bodies of the spokes outwardly of said conical portion.

4. An artillery wheel body including a single sheet metal stamping adapted to transmit substantially all of the wheel load between a hub element and a rim element, said stamping comprising a nave including a mounting portion forming the sole support for the remainder of the wheel body and a spoke-bearing portion arranged radially outwardly of said mounting portion, said spoke-bearing portion having its radially outer areas deeply dished axially in one and the same general direction, said nave being so constructed and arranged as to provide a single dished load-supporting disc and short hollow-sectioned spoke formations having roots pressed from said areas with the hollow cross sections of their bodies in open communication with the interior of said areas thereby interrupting portions of said areas, said spoke formations being constructed and arranged to stiffen said areas to thereby measurably compensate for impairment of strength through said interruption, the outer periphery of said spoke-bearing portion being at least midway from the outer periphery of the mounting portion to the outer ends of said spoke formations.

5. An artillery wheel body including a single stamping adapted to transmit substantially all of the wheel load between a hub element and a rim element, said stamping comprising a nave including a mounting portion from which the wheel body extends freely to the rim element, a generally axially extending portion projecting freely from the periphery of said mounting portion, and a spoke-bearing portion extending from the end of said generally axially-extending portion removed from said mounting portion and at least partially overlying said generally axially-extending portion and terminating in an outer peripheral edge of relatively large diameter as compared to the outer peripheral diameter of said mounting portion and having its radially outer areas deeply dished axially in one and the same general direction from said peripheral edge, said nave being so constructed and arranged as to provide a single dished load-supporting disc in operation, and short hollow-sectioned spoke formations having roots pressed from said areas with the hollow cross-sections of the their bodies in open communication with the interior of said areas thereby interrupting portions of said areas, said spoke formations being constructed and arranged to stiffen said areas to thereby measurably compensate for impairment of strength through said interruption.

6. A combined disc and artillery wheel body of the demountable bolted-on type comprising a single wheel load-carrying stamping having a nave provided with a radial mounting portion and a dished portion extending freely outwardly from said mounting portion to a point at least midway from the outer periphery of said mounting portion to the outer periphery of the wheel body at large, and spoke formations of hollow section having roots pressed from the peripheral areas of the last-named portion and having main bodies projecting radially outwardly for attachment to a rim, said nave having radial and axial extents beyond the outer periphery of the mounting portion the sum of which extents is not less than approximately twice the radial length of the main bodies of the spoke formations, said nave being thereby constructed and arranged to have the characteristic section modulus and behavior in operation of the single-dished-disc-type of wheel body.

7. A vehicle wheel body of the demountable bolted-on type forming the sole connection between a hub element and rim element, said wheel body consisting solely of a single unsupported stamping having a nave comprising a substantially radially extending bolting-on flange for attachment to the hub element, a generally axially extending portion projecting freely from the periphery of said flange and a generally conical disc-like spoke-bearing portion, and spoke formations having main bodies of hollow section extending radially out from said conical spoke-bearing portion and having roots pressed therefrom, said spoke-bearing portion extending radially and axially from the end of said annular portion removed from said flange and overlying the axially extending portion for at least the major portion of the axial depth of said portion and forming with said portion an axially facing channel, said channel having a radial width at its mouth at least as great as the length of the spoke formations and an axial depth greater than one-quarter of its radial width, thereby giving to said nave the characteristic high section modulus in the diametral plane of the single-dished-disc-type of wheel body.

8. A combined disc and artillery wheel body of the demountable bolted-on type comprising a single wheel load-carrying stamping having a nave including a radial mounting portion from which the remainder of the wheel body extends free of other support to the rim, and spokes of hollow section having roots pressed from the peripheral areas of the nave and main bodies projecting radially therebeyond for attachment to a rim, both the radial and axial extents of said nave outwardly of the mounting portion being at least as great as the length of the main bodies of the spokes, said nave being constructed and arranged to include an axially-facing channel having an axial depth not less than approximately one-half of the depth of the wheel body and to have in operation the behavior of the single-dished-type of wheel body.

9. In a combined disc and artillery wheel, a wheel body including a bolting-on flange adapted for attachment to a hub element and extending freely from said bolting-on flange to a rim element, said wheel body consisting solely of a single stamping adapted to take substantially the entire load between the rim element and the hub element, said stamping including a bolting-on flange portion and having three annular zones, the inner zone comprising a dished disc portion of substantial radial extent, the outer zone comprising short hollow section spokes of high section modulus and the intermediate zone being of substantial radial and axial extent and constituting a merger between the inner disc and the outer spoke zones in which the spokes have roots pressed out of and emerging gradually from a prolongation of the inner disc zone and through which the spokes open radially inwardly, said intermediate zone having an axial extent greater than the axial depth of the spokes and being reinforced by said spokes, the radially outer extremity of the intermediate zone being at least midway from the outer periphery of the bolting-on flange portion to the outer periphery of the stamping.

10. A combined disc and artillery wheel body consisting of a single unsupported stamping adapted to take the entire load between a rim and a hub, said stamping comprising a bolting-on flange and outwardly of said flange a freely extending portion including three annular zones, the inner zone comprising a dished disc portion of substantial radial and axial extent, the outer zone comprising short spokes of high section modulus and the intermediate zone constituting a merger between the inner disc and outer spoke zones and through which the spokes open radially inwardly, said intermediate zone having an axial extent greater than the axial depth of the spokes and being reinforced by said spokes, the radially outer extremity of the intermediate zone being at least midway from the outer periphery of the bolting-on flange portion to the outer periphery of the stamping.

11. A combined disc and artillery wheel body consisting of a single unsupported stamping adapted to take the entire load between a rim and a hub, said stamping comprising a bolting-on flange and outwardly of said flange a freely extending portion including three annular zones, the inner zone comprising a dished disc portion of substantial radial and axial extent, the outer zone comprising short spokes of high section modulus and the intermediate zone constituting a merger between the inner disc and outer spoke zones and through which the spokes open radially inwardly, said intermediate zone having an axial extent greater than the axial depth of the spokes and being reinforced by said spokes, the radially outer extremity of the intermediate zone being at least midway from the outer periphery of the bolting-on flange portion to the outer periphery of the stamping, the inner and intermediate zones combining to produce an annular axially facing channel.

12. A combined disc and artillery wheel body consisting of a single unsupported stamping adapted to take the entire load between a rim and a hub, said stamping comprising a bolting-on flange and outwardly of said flange a freely extending portion including three annular zones, the inner zone comprising a dished disc portion of substantial radial and axial extent, the outer zone comprising short spokes of high section modulus and the intermediate zone constituting a merger of substantial axial extent between the inner and outer zones reinforced by said spokes and located by the diameter of the inner zone in a region of minor wheel stresses, said intermediate and inner zones combining to produce an axially facing channel having an axial depth at least as great as the radial extent of the outer zone.

CAROLUS L. EKSERGIAN.